(12) United States Patent
Krantz et al.

(10) Patent No.: US 8,488,612 B2
(45) Date of Patent: Jul. 16, 2013

(54) SYSTEM AND METHOD FOR METHOD FOR PROVIDING QUALITY-OF SERVICE IN A LOCAL LOOP

(75) Inventors: David Krantz, Warren County, NJ (US); Douglas M. Nortz, Monmouth County, NJ (US); Robert Sayko, Monmouth County, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1071 days.

(21) Appl. No.: 11/262,611

(22) Filed: Oct. 31, 2005

(65) Prior Publication Data
US 2006/0104203 A1    May 18, 2006

Related U.S. Application Data

(60) Provisional application No. 60/623,899, filed on Nov. 1, 2004.

(51) Int. Cl.
*H04L 12/56* (2006.01)

(52) U.S. Cl.
USPC .................................................. 370/395.21

(58) Field of Classification Search
USPC ......... 370/328, 329, 410, 465, 467, 229–235, 370/252–253, 351–362, 395.2–395.3; 709/232, 709/233, 227, 249; 455/433, 517
See application file for complete search history.

(56) References Cited

U.S. PATENT DOCUMENTS

| | | | |
|---|---|---|---|
| 6,577,642 B1 * | 6/2003 | Fijolek et al. ................. | 370/465 |
| 6,683,853 B1 * | 1/2004 | Kannas et al. ................ | 370/237 |
| 6,760,312 B1 | 7/2004 | Hitzeman | |
| 6,823,385 B2 | 11/2004 | McKinnon, III et al. | |
| 6,917,622 B2 | 7/2005 | McKinnon, III et al. | |
| 6,917,628 B2 | 7/2005 | McKinnin, III et al. | |
| 6,950,407 B1 * | 9/2005 | Huddle ........................ | 370/254 |
| 7,248,682 B1 * | 7/2007 | Oran ........................ | 370/395.52 |
| 7,380,022 B2 * | 5/2008 | Tell et al. ...................... | 709/249 |
| 7,400,576 B2 * | 7/2008 | Mori et al. ..................... | 370/229 |
| 7,480,241 B2 * | 1/2009 | Hanks et al. .................. | 370/231 |
| 7,522,579 B1 * | 4/2009 | Mangal et al. ................ | 370/352 |
| 2001/0048682 A1 * | 12/2001 | Fichou et al. ................. | 370/392 |
| 2001/0048683 A1 * | 12/2001 | Allan et al. ............... | 370/395.21 |
| 2002/0075844 A1 * | 6/2002 | Hagen .......................... | 370/351 |
| 2002/0129377 A1 * | 9/2002 | Cloonan et al. .............. | 725/111 |
| 2002/0132611 A1 * | 9/2002 | Immonen et al. ............. | 455/414 |
| 2002/0165966 A1 * | 11/2002 | Widegren et al. ............. | 709/226 |
| 2003/0058794 A1 * | 3/2003 | Pantelias et al. ............. | 370/230 |
| 2003/0095569 A1 * | 5/2003 | Wengrovitz et al. .......... | 370/467 |
| 2003/0117954 A1 * | 6/2003 | De Neve et al. .............. | 370/230 |
| 2003/0126615 A1 * | 7/2003 | Fukada ......................... | 725/111 |
| 2004/0063497 A1 * | 4/2004 | Gould ............................. | 463/42 |

(Continued)

Primary Examiner — Jeffrey M Rutkowski
Assistant Examiner — Juvena Loo
(74) Attorney, Agent, or Firm — Scott P. Zimmerman, PLLC

(57) ABSTRACT

Described is a system and method for receiving in a first network operated by a first network provider, a service request from a client for a service application provided by the first service provider, the client accessing the first network via a second network operated by a second network provider, wherein the service request includes a level of service that is to be provided to the service application. The level of service is communicated to the second network provider and, subsequent to receiving the service request, the level of service is purchased from the second network provider to guarantee the client the level of service when accessing the second network.

7 Claims, 3 Drawing Sheets

U.S. PATENT DOCUMENTS

| | | | |
|---|---|---|---|
| 2004/0148391 A1* | 7/2004 | Lake, Sr. et al. | 709/224 |
| 2004/0160945 A1* | 8/2004 | Dong et al. | 370/352 |
| 2004/0160963 A1* | 8/2004 | Dong et al. | 370/395.21 |
| 2005/0025136 A1* | 2/2005 | Anschutz et al. | 370/352 |
| 2005/0078690 A1* | 4/2005 | DeLangis | 370/401 |
| 2006/0028982 A1* | 2/2006 | Wright | 370/230 |

* cited by examiner

SYSTEM AND METHOD FOR METHOD FOR PROVIDING QUALITY-OF SERVICE IN A LOCAL LOOP

PRIORITY CLAIM/INCORPORATION BY REFERENCE

This application claims priority to U.S. Provisional Patent Appln. 60/623,899, entitled "Method and Apparatus for Providing Quality-of-Service Parameters Over Hybrid Fiber Coax Network" filed Nov. 1, 2004 which is incorporated, in its entirety, herein.

BACKGROUND

Telecommunications networks, such as hybrid fiber coax ("HFC") networks, often suffer from service problems. Examples of service problems include dropped packets, latency, lost packets, and corrupted packets. To overcome these problems, many telecommunications networks provide additional resources in order to ensure satisfactory service. The providing of these additional resources is known as Quality of Service ("QoS"). In an HFC network, the cables are generally owned and operated by a multiple system operator ("MSO"). A subscriber to a telecommunications service, such as a Voice over Internet Protocol ("VoIP") service, receives the service through what is known in telecommunications terms as the "last mile" or "local loop" of the HFC network. Because the local loop is operated by the MSO, a provider of the service cannot provide QoS to the subscriber. Accordingly, there is a need for providing QoS over the local loop.

SUMMARY OF THE INVENTION

A method for receiving in a first network operated by a first network provider, a service request from a client for a service application provided by the first service provider, the client accessing the first network via a second network operated by a second network provider, wherein the service request includes a level of service that is to be provided to the service application. The level of service is communicated to the second network provider and, subsequent to receiving the service request, the level of service is purchased from the second network provider to guarantee the client the level of service when accessing the second network.

A system having a first element in a first network operated by a first network provider, receiving a service request from a client for a service application provided by the first service provider, a second element in the first network analyzing the service request and determining a level of service that is to be provided to the service application and a third element in the first network communicating the level of service to a second network provider and completing a transaction for the purchase of the level of service in a second network operated by the second network provider, wherein the client accesses the service application provided by the first network provider via the second network using the purchased level of service on the second network.

A method including receiving in a first network operated by a first network provider, a service request from a second network provider for a level of service in the first network, allocating the level of service within the first network when it is determined that the service request is valid, initiating a transaction to charge the second network provider for the level of service in the first network, receiving a reservation request from a client to use the allocated level of service within the first network and enabling a media path for the client within the first network, wherein the media path includes the level of service.

A system having a policy server in a first network operated by a first network provider, a service request from a second network provider for a level of service in the first network, the policy server allocating the level of service within the first network when it is determined that the service request is valid and initiating a transaction to charge the second network provider for the level of service in the first network and a termination system receiving the level of service allocation from the policy server and further receiving a reservation request from a client to use the allocated level of service within the first network, the termination system enabling a media path for the client within the first network, wherein the media path includes the level of service.

DETAILED DESCRIPTION

Figure 1:
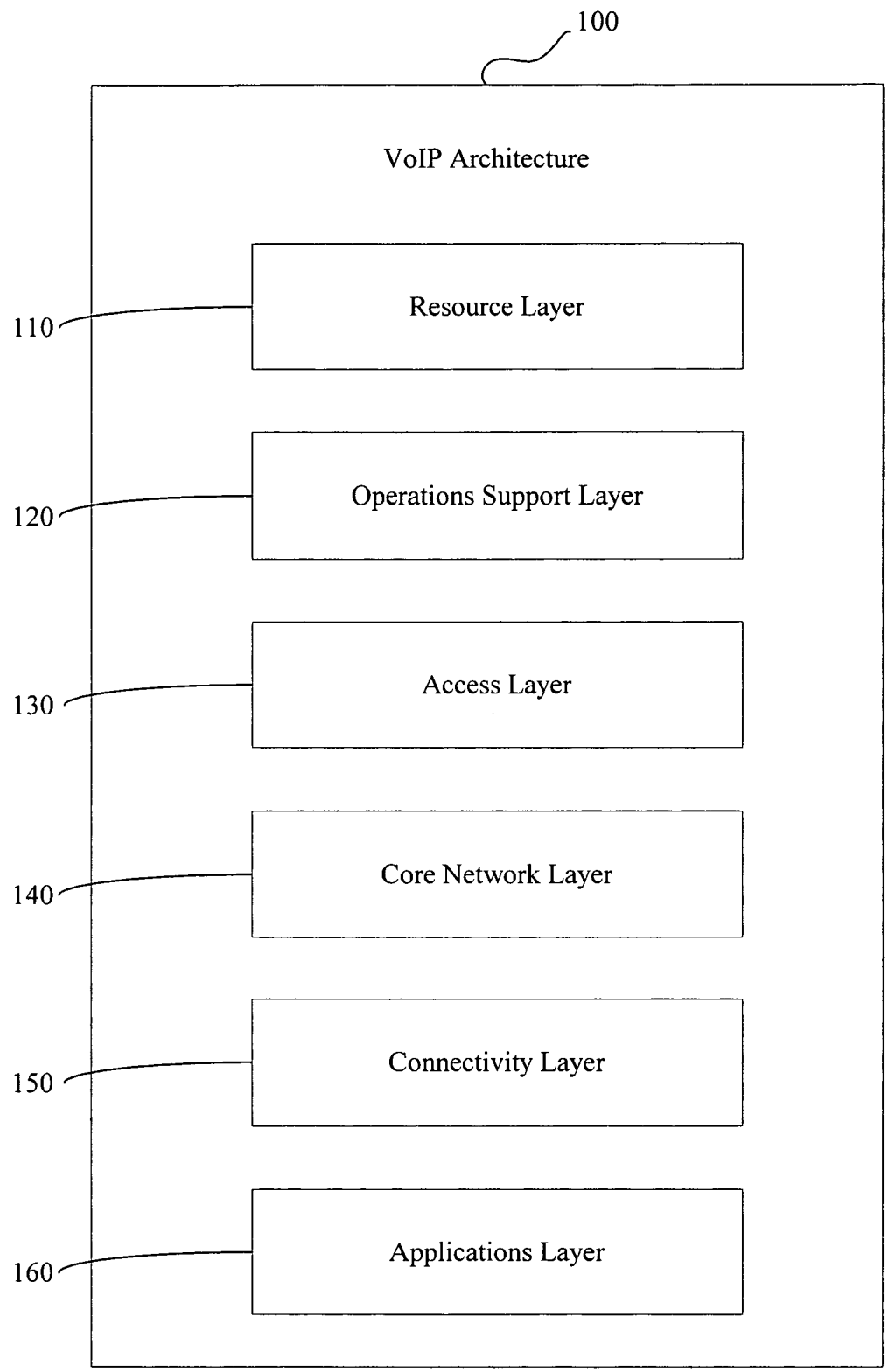
FIG. 1 shows an exemplary embodiment of a VoIP architecture.

The present invention may be further understood with reference to the following description and the appended drawings, wherein like elements are referred to with the same reference numerals. The exemplary embodiment of the present invention describes a method for providing Quality of Service ("QoS") in a telecommunications network. More specifically, the exemplary embodiment describes a method of providing QoS in a hybrid fiber coax ("HFC") network that delivers Voice over Internet Protocol ("VoIP") services. A functional description of a VoIP architecture will be described below. Following this description, a system that is compatible with the VoIP architecture will be discussed along with a method for providing QoS.

Those of skill in the art will understand that the present invention is not limited to VoIP services. The exemplary embodiments are described with reference to VoIP services because currently this an example of a type of service where QoS is an important factor because customers may hear the effects of dropped or delayed packets. However, as will be seen from the exemplary embodiments, any service which desires or requires a higher level of service than the normal packet transmission service may implement the present invention.

As described above, the provider of these services may not be the provider of the "last mile" or "local loop" to the end customer. Thus, the service provider (e.g., VoIP service provider) is relying on the owner of the HFC infrastructure to provide QoS for the VoIP packets. Because the VoIP service provider does not control this last mile, the VoIP service provider cannot make direct QoS guarantees to the end customer. This places these VoIP service providers at a competitive disadvantage because they cannot make this guarantee. The present invention provides a system and method for the service provider to have reliable and guaranteed access to the last mile. It also allows the HFC infrastructure owner to generate revenue that may have otherwise gone to a third party such as a local exchange carrier ("LEC"). Thus, the exemplary embodiments of the present invention provide for a mutually beneficial relationship to be arranged between the service provider and the owner/operator of the HFC network.

FIG. 1 shows an exemplary VoIP architecture 100 for a VoIP service that may utilize the exemplary embodiments of the present invention to guarantee QoS to its customers. As described above, the use of a VoIP service is only exemplary. The VoIP architecture 100 is divided into several layers. Each layer comprises a distinct function or group of related functions. The VoIP architecture 100 may include a Resource Layer 110, an Operations Support Layer 120, an Access Layer 130, a Core Network Layer 140, a Connectivity Layer 150, and an Applications Layer 160. The Resource Layer 110 provides network resources used to provide a VoIP service such as AT&T Corp.'s CallVantage® service. The network resources may include systems which are owned and operated by a VoIP provider and/or a third party.

The Operations Support Layer 120 includes components for managing a VoIP network. These components may include applications, databases, and a data communications network. The Access Layer 130 provides for communication between a subscriber of the VoIP services and the Connectivity layer. Devices which may be part of the Access Layer 130 include the hardware with which a subscriber to a VoIP service might access the service. For example, the hardware may include a telephone, a cable modem, a computing device, etc. In addition, the Access Layer 130 may also include communications networks, such as a multiple system operator ("MSO") IP network and a Signaling System 7 ("SS7") network. The Access Layer 130 may also include a cable modem termination system ("CMTS") and other devices that form an MSO's core network (e.g., policy servers, record keeping servers, etc.). Some of these components will be described in greater detail below.

The Core Network Layer 140 provides a network for the routing and transport of IP packets, and overlaps with the Connectivity Layer 150. The Core Network Layer 40 may include call control elements, media servers, and a Session Initiation Protocol ("SIP") border element ("BE") which translates access protocols to and from SIP as well as provides signaling, media control, security, and call admission control ("CAC") functions.

The Connectivity Layer 150 provides capabilities for creating, joining, removing, and reporting the status of call legs. Included in the Connectivity Layer 150 are the SIP BE, a Communications Assistance for Law Enforcement Act of 1994 ("CALEA") server, a CAC unit, a call control element ("CCE"), an Enhanced 911 ("E911") server, and a media server. The Applications Layer 160 includes one or more application servers which provide services. The application server(s) may direct the CCE to create, join, remove, and modify the call legs. The application server(s) may also create a call leg to the media server to access services provided by the media server. As described above, this reference to a VoIP service is only exemplary and some of the components described above, will be described in greater detail below in describing the exemplary embodiments of the present invention.

Figure 2:
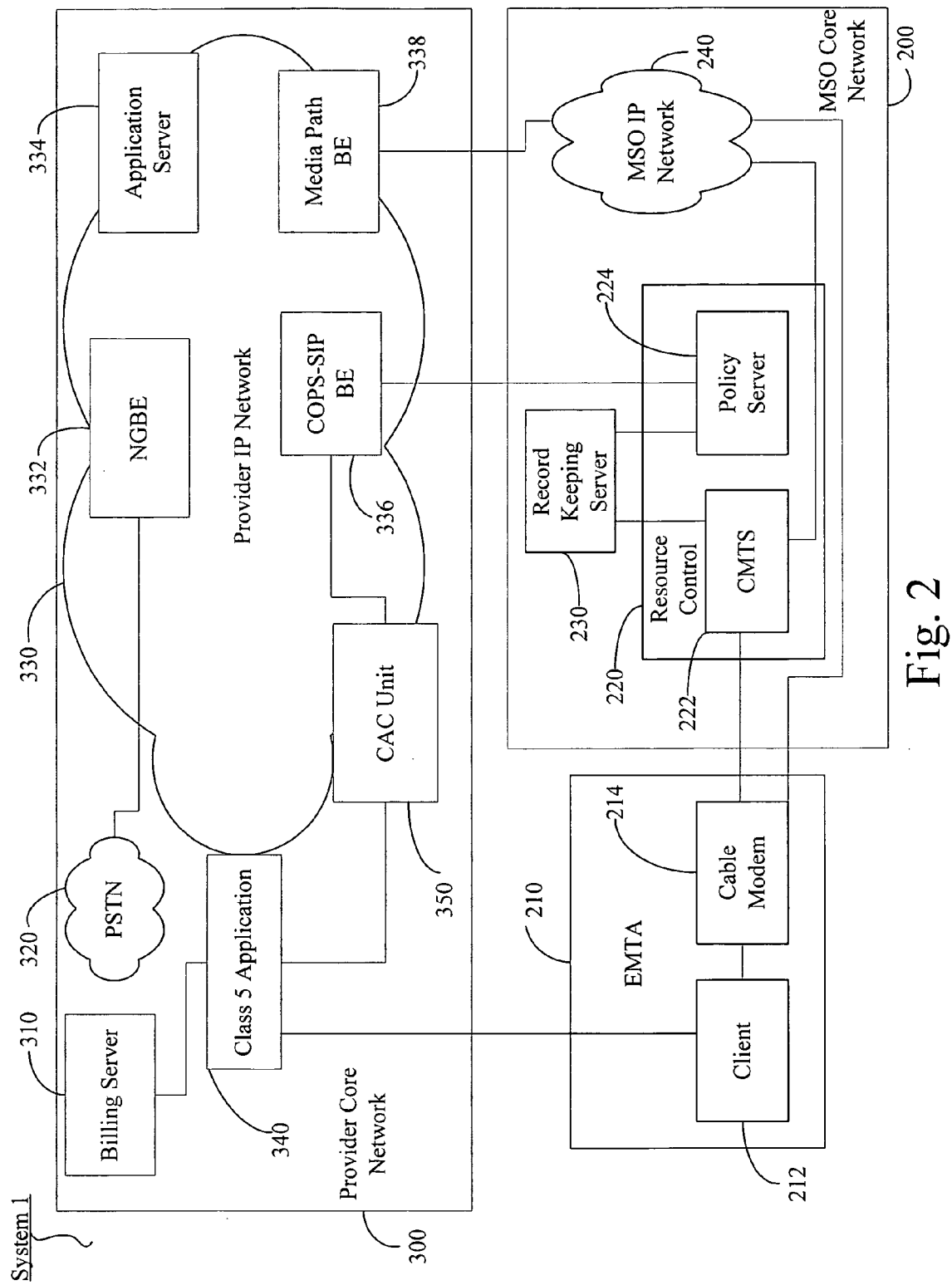
FIG. 2 shows an exemplary embodiment of a system for providing QoS according to the present invention.

FIG. 2 shows an exemplary embodiment of a system 1 for providing QoS for a service from a service provider that does not own the last mile, e.g., the HFC network. The system 1 will be described with reference to an exemplary method 400, shown in FIG. 3, that may be implemented on the system 1 for the purpose of providing a QoS guarantee to a service of the service provider. The system 1 may be divided into an MSO core network 200 and a provider core network 300. In the exemplary embodiment, the system 1 utilizes the Packet-Cable™ Multimedia Architecture which is a project led by Cable Television Laboratories, Inc. ("CableLabs®") with the goal of defining interface specifications for interoperable equipment providing IP-based services (e.g., VoIP) over HFC systems. The system 1 is compatible with the VoIP architecture 100 and includes many of the components discussed above with reference to the VoIP architecture 100. Those skilled in the art will understand that the omission of certain of the above-discussed components does not imply that these components are neither essential nor desirable to the operations of the system 1. In addition, one skilled in the art would understand that the system 1 may be easily adapted for compatibility with other VoIP service architectures and architectures for different types of non-VoIP services.

The MSO core network 200 may include an embedded multimedia terminal adapter ("EMTA") 210 which includes a client communication device 212 and a cable modem 214. The client 212 may be any type of device that has communication capability, for example, an IP-enabled phone utilizing an Ethernet connection, a computing device with communication capability, etc. As will be described in greater detail below, the cable modem 214 is the component that connects the client 212 to the MSO core network via, for example, a HFC cable. The EMTA 210 and its components 212, 214 are shown as autonomous components that are neither part of the MSO core network 200 nor the provider core network 300. Those of skill in the art will understand that these components may be considered to be autonomous because they are resident at the customer's premises or as part of the either the MSO core network 200 or the provider core network 300. In this example, since the service provider is providing the application that will be requesting the QoS guarantee, it may be considered that the EMTA 210 and its components 212, 214 are under the control of the service provider.

Figure 3:
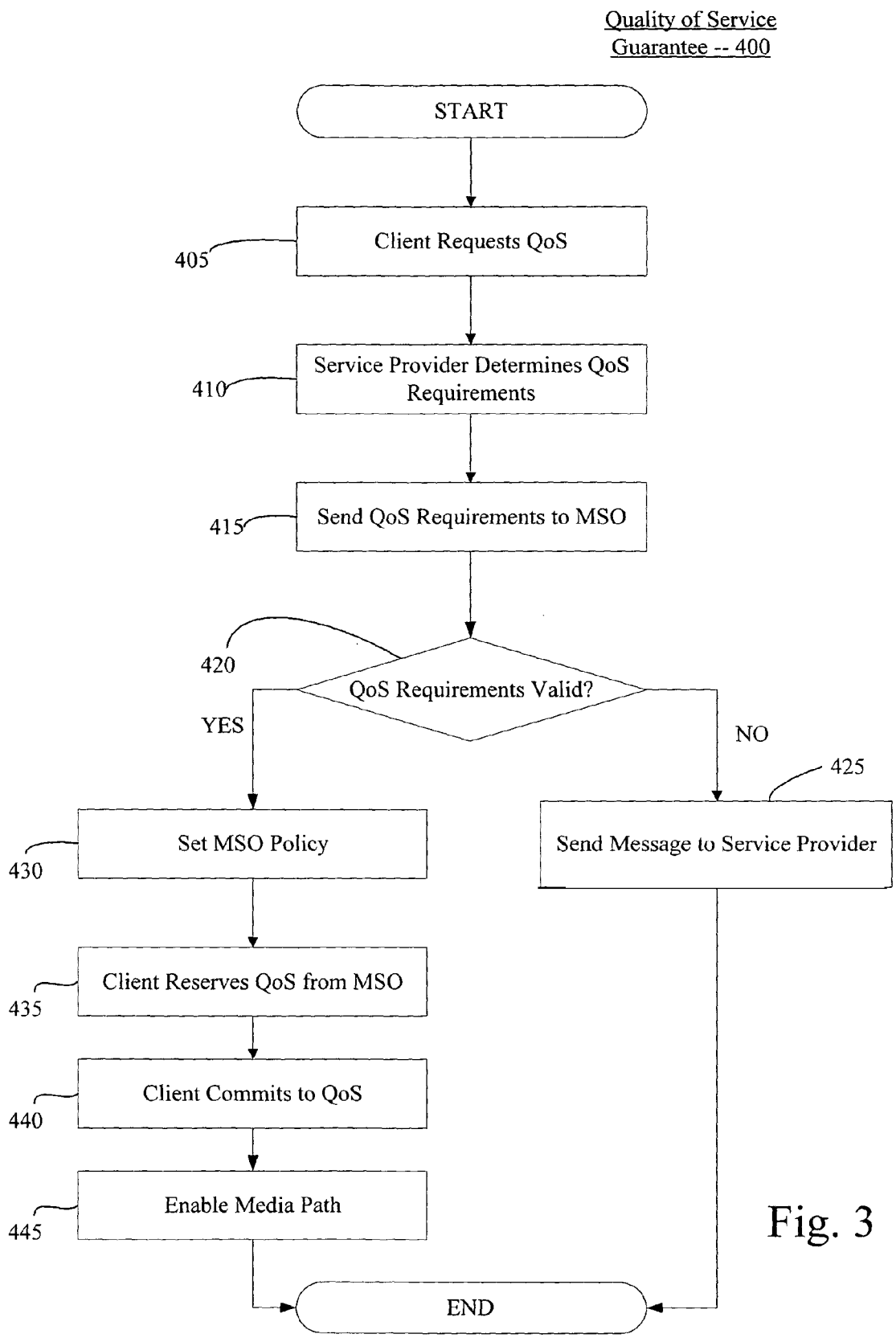
FIG. 3 shows an exemplary embodiment of a method for providing QoS according to the present invention.

Referring to FIG. 3, in the first step 405, the client 212 requests QoS for a particular service (e.g., VoIP service). In this example, this request is shown as being transmitted from the client 212 to a Class 5 application 340 residing on the provider core network 300. In this example, the request is shown as being transmitted directly from the client 212 to the Class 5 application 340 using SIP as implemented in the provider network 300. Those of skill in the art will understand that FIG. 2 only shows the request in a functional manner and that there may be many components that are present for communications to be completed from the client 212 to the Class 5 application 340. For example, the client 212 may not use the SIP protocol and thus, there may be an intermediate component that translates the message from the client 212 into a SIP message. In addition, it is not necessary that the communication from the client 212 to the provider core network 300 be made using the SIP standard. This is only exemplary based on the exemplary use of a VoIP service, i.e., other services may use different communication protocols that are more appropriate for the particular service.

The QoS service request will include the standard items which are normally included in SIP messages, e.g., number (IP address) to be called, number (IP address) of caller, etc. The Class 5 application 340 will receive the QoS request and pass the request to the Call Admission Control ("CAC") unit 350. A QoS application manager is included in the CAC unit 350 for the purpose of analyzing the QoS request and determining the QoS requirements for the intended service application. Those of skill in the art will understand that a standard SIP message for a VoIP call will include sufficient information for the QoS application manager to determine the QoS requirements in the same manner as if the call were being completed using the provider core network 300 without the use of the MSO network, i.e., the level of QoS that the service provider desires to apply to the call. In addition, the class 5 application 340, the CAC unit 350 and/or another component of the provider network 300 in communication with the CAC unit 350 may also provide information that the QoS application manager may use to determine the QoS requirements for the application, e.g., a level of service guaranteed to the client 212, etc. Those of skill in the art will understand that QoS requests that are transmitted in other protocols may need to include specific information that allows the QoS application manager to make a determination as to the QoS requirements of the requested service application.

It is also noted that the class 5 application 340 is also connected to the service provider's billing server 310 for the purposes of collecting billing information for the call. This billing information may be information that is used to bill the client 212, e.g., a caller's number, a callee's number, a duration of a call, etc.) as well as network monitoring information (e.g., a total number of packets sent/received, an average packet size, an average transmission time, etc.). The billing server 310 may also be used to verify the charges that are due to the MSO from the service provider for the purchase of the QoS guarantee for the particular call. As will be described in greater detail below, the QoS request may ultimately result in the wholesale purchase of a QoS guarantee by the service provider from the MSO. Thus, the service provider may keep independent records of these purchases to verify any charges that are received from the MSO.

In step 415, the service provider sends the QoS requirements to the MSO in order to make a wholesale purchase of the QoS guarantee for the particular service application. Referring back to FIG. 2, the QoS requirements are initially sent within the provider core network from the CAC unit 350 to a Common Open Service Policy protocol—Session Initiated Protocol border element ("COPS-SIP BE") 336. As indicated by its name, the COPS-SIP BE 336 will receive the QoS requirements in the SIP protocol from the CAC unit 350 and convert the QoS requirements into the COPS protocol for the purpose of transmitting the QoS requirements to the MSO core network 200.

The QoS requirements will be received by a policy server 224 in the MSO core network 200. In step 420, the policy server 224 will determine whether the QoS requirements are valid. In particular, the policy server 224 may include a set of rules that are used to validate incoming requests for QoS requirements. The set of rules may include any type of rules that the MSO may desire to evaluate the QoS requests. For example, the message that is sent from the COPS-SIP BE 336 may include an indication of the service provider that is making the request for the QoS purchase. Thus, a rule may include a check of whether the MSO has a contract or agreement with the identified service provider (or whether the message includes a service provider identification). In another example, the message may also include the IP address or other identifier of the client 212. In this instance, the policy server 224 may include a rule that checks that the client 212 has access to the MSO's HFC network.

The rules may also be network based rules such as comparing the current capacity of the MSO's network to determine if there is network capacity to make the purchase of a QoS guarantee possible. Those of skill in the art will understand that the relationship between the service provider and the MSO may be governed by a contract or other agreement which guarantees access to the MSO network and thus, capacity based rules may not be applicable, i.e., the MSO may not have an option of denying the request unless there is some other reason. However, this example was provided to show that the policy server 224 may implement any type of rule to evaluate the incoming request.

If the policy server 224 determines that the QoS requirements are not valid in step 420, in step 425, the policy server 224 will send a message back to the service provider via the COPS-SIP BE 336. The message will then be relayed to the CAC unit 350 and may be sent via the Class 5 application 340 to the client 212. The message may indicate the reasons for the denial of QoS so that the QoS application manager of the CAC unit 350 can cure the defect or indicate to the client 212 the defect. If the QoS request is denied, the process ends and the client 212 does not receive the QoS guarantee for the service application.

However, if the policy server 224 determines that the QoS request is valid in step 420, the process continues to step 430 where the policy server 224 sends a policy set message to a CMTS 222 in the MSO core network 200. The CMTS 222 may be included as part of a resource control arrangement 220 which also includes the policy server 224. The policy set message may include information that the CMTS 222 may use to set up a media path for the client 212. For example, the policy set message may provide the parameters that should be guaranteed for a media path that is enabled for the client 212, e.g., maximum latency, maximum number of dropped packets, etc.

This example also shows that the policy server 224 may also include rules relating to the QoS guarantee that should be delivered to a particular client or class of clients based on the service provider. For example, a service provider may have a standing agreement with the MSO that any request from the service provider should have a predetermined level of service. Thus, when the policy server 224 receives a request from the service provider, the rules contained therein may indicate the predetermined level of service and this information may be forwarded to the CMTS 22 in the policy set message.

At the completion of step 430, the MSO core network 200 has been authorized to provide the client 212 with a defined QoS to meet the QoS requirements identified in the QoS request from the client 212 to the service provider. Described in another manner, the MSO has provided the service provider with a QoS guarantee that it will meet the QoS requirements defined in the message sent to the policy server 224. Thus, the service provider may guarantee the client 212 is provided with a desired level of service, for example, as defined in a Service Level Agreement ("SLA"). However, as can be seen from the above, the service provider does not need to pre-purchase the QoS guarantee from the MSO, but may purchase the QoS guarantee on-demand as client 212 (or other clients) need access to the MSO's core network 200. As described above, the service provider and the MSO may have a standing agreement as to the cost to the service provider for particular QoS guarantees, but the exemplary embodiments of the present invention alleviates the need to actually purchase the QoS guarantees until they are needed.

In step 435, the client 212 may interact with the CMTS 222 to reserve the QoS guarantee for the service application. As described briefly above, the client 212 may communicate with the MSO core network 200 via the cable modem 214 as shown in FIG. 2. Since the exemplary MSO core network 200 includes a last mile HFC arrangement, the cable modem 214 is used to provide an interface between the client 212 and the CMTS 222 of the MSO core network 200. The client 212 may communicate the QoS reservation, for example, in accordance with the Data Over Cable Service Interface Specification ("DOCSIS") DSx developed by CableLabs®, RSVP+ messaging, etc.

The reservation sent by the client 212 may add, change or delete QoS within the authorized envelope with the CMTS 222. Specifically, the policy server 224 may provide the CMTS 222 with a specific QoS envelope in the policy set message based on the QoS requirements sent by the service provider. However, the client 212 may desire a different QoS than the one that has been set aside for the service application. Thus, as long as the QoS reserved by the client 212 is within the scope of the grant of QoS by the policy server 224, the CMTS 222 may allow the client 212 to modify the original request.

In step 440, the client 212 commits to the QoS reservation, i.e., the client sends a message to the CMTS 222 indicating that the client 212 will use the reserved QoS for the service application, e.g., a VoIP phone call. Thus, the exemplary embodiment of the present invention uses a two-stage reservation and commit model for the client 212. However, the present invention is not limited to a two-stage reservation and commit model, e.g., a one stage commit to the QoS is also possible.

In step 445, the CMTS 222 enables a media path for the client 212 into the MSO IP network 240. As shown in FIG. 2, the client 212, via the cable modem 214 has access via the last mile HFC network of the MSO to the MSO IP network 240 and, as described above, the client 212 has a QoS guarantee for the media path that is enabled. The client 212 may, for example, place a VoIP call that is routed via the MSO IP network 240 to the provider IP network 330 via a media path border element 338. The provider network 330 may then route the VoIP call as appropriate, e.g., to the PSTN 320 via the network gateway border element (NGBE) 332, to another IP phone on the service provider or other provider's network, etc. In addition, once the VoIP call has entered the provider IP network 330, other services may be provided for the call using the application server 334, e.g., call-related services, such as caller ID, call waiting, and conference calling.

However, as described above, the exemplary embodiments of the present invention are not concerned with the treatment of the service application (e.g., a VoIP call) once it reaches the provider IP network 330, but rather the guaranteeing of QoS for the service application on the MSO HFC network. Specifically, in the example above, once the client 212 has reserved and committed to the QoS and the CMTS 222 has enabled the media path, the client is now guaranteed that the desired level of service is being applied to the service application. Therefore, the service provider is able to guarantee the client 212 that they will have a desired level of service for the service application, even though the service provider does not own, operate or control the last mile HFC network that the client 212 is using to complete the service application.

Referring back to FIG. 2, the MSO core network 200 is also shown as including a record keeping server 230 that communicates with the CMTS 222 and the policy server 224. The record keeping server 230 serves a similar function to the billing server 310 described above. Specifically, the record keeping server 230 records the level and amount of QoS that is provided to the clients of each of the service provider's that request specific QoS guarantees on the HFC network of the MSO, e.g., a total number of packets sent/received, an average packet size, an average transmission time, a level of service provided to the packets, etc.). The MSO may then use this information to bill the service provider for the QoS guarantees that have been purchased by the service provider.

In the above description, it has been described that the service provider and the MSO have a pre-existing agreement governing the purchase of QoS guarantees by the service provider from the MSO. However, it may also be possible to negotiate this purchase without a pre-existing agreement. For example, an MSO may have an exposed policy server 224 that a service provider may access via a COPS-SIP BE 336. The message from the COPS-SIP BE 336 to the policy server may include a request for a QoS guarantee. The policy server 224 may include rules that indicate the cost of the requested QoS guarantee that is relayed back to the service provider via the COPS-SIP BE 336. The service provider may then accept or decline the offered QoS guarantee from the MSO.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    sending a service request over a direct connection between a residential client and a class 5 service application provided by a first network provider of a first network;
    specifying a quality of service in the service request that is to be applied to a voice over internet protocol call between a calling address and a called address;
    translating the service request into sessions initiation protocol;
    passing a translated service request from the class 5 service application to a call admission control unit;
    determining requirements for the quality of service specified in the translated service request;
    sending the requirements for the quality of service from the call admission control unit to a border element of the first network;
    translating the requirements in the border element from the sessions initiation protocol to an access protocol of a second network operated by a multiple systems operator;
    sending translated requirements from the border element in the first network to a policy server in the second network;
    comparing the translated requirements for the quality of service to rules stored in the policy server;
    validating the translated requirements for the quality of service in the second network;
    sending a policy set message from the policy server over the second network to a cable modem termination system serving the residential client in the second network; and
    guaranteeing parameters in the second network for the quality of service to be applied to the voice over internet protocol call between the residential client at the calling address and the called address.

2. The method of claim 1, further comprising receiving a commitment from the residential client for the quality of service.

3. The method of claim 1, further comprising denying the requirements for the quality of service based on the rules stored in the policy server.

4. The method of claim 1, further comprising invaliding the requirements for the quality of service.

5. The method of claim 1, wherein the quality of service is greater than a lowest quality of service provided in the first network.

6. The method of claim 1, further comprising defining the quality of service by one of a latency of packet delivery and a number of dropped packets.

7. A method, comprising:

sending a service request over a direct connection between a residential client and a class 5 service application provided by a first network provider of a first network;

specifying a quality of service in the service request that is to be applied to a voice over internet protocol call between the residential client at a calling address and a called address;

translating the service request into sessions initiation protocol;

passing a translated service request from the class 5 service application to a call admission control unit;

determine requirements for the quality of service specified in the translated service request;

sending the requirements for the quality of service from the call admission control unit to a border element of the first network;

translating the requirements in the border element from the sessions initiation protocol to an access protocol of a second network operated by a multiple systems operator;

sending translated requirements from the border element in the first network to a policy server in the second network;

comparing the translated requirements for the quality of service to rules stored in the policy server;

determining the translated requirements for the quality of service are invalid for the second network;

sending a message from the policy server to the class 5 service application in the first network that denies the requirements for the quality of service; and relaying the message from the class 5 service application over the direct connection to the residential client to deny the voice over internet protocol call between the residential client at the calling address and the called address.

* * * * *